(«12») United States Patent
Vankieken

(10) Patent No.: US 11,539,242 B2
(45) Date of Patent: Dec. 27, 2022

(54) METHOD FOR ACTIVATING FUNCTIONS, IMPLEMENTED IN A HOST APPLIANCE INTEGRATING OR LINKED TO A WIRELESS CHARGING DEVICE

(71) Applicant: SAGEMCOM BROADBAND SAS, Rueil Malmaison (FR)

(72) Inventor: Nicolas Vankieken, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 207 days.

(21) Appl. No.: 16/704,485

(22) Filed: Dec. 5, 2019

(65) Prior Publication Data

US 2020/0187299 A1 Jun. 11, 2020

(30) Foreign Application Priority Data

Dec. 6, 2018 (FR) ...................................... 1872467

(51) Int. Cl.
*G06F 3/041* (2006.01)
*H02J 50/10* (2016.01)
(Continued)

(52) U.S. Cl.
CPC .............. *H02J 50/10* (2016.02); *H02J 50/80* (2016.02); *H02J 50/90* (2016.02); *H04W 88/04* (2013.01)

(58) Field of Classification Search
CPC .. H02J 50/10; H02J 50/80; H02J 50/90; H02J 2310/22; H02J 7/00034; H02J 7/0071;
(Continued)

(56) References Cited

U.S. PATENT DOCUMENTS

2015/0380977 A1* 12/2015 Sentosa ................. H02J 7/0032
320/108
2017/0289277 A1 10/2017 Lee et al.
(Continued)

FOREIGN PATENT DOCUMENTS

CN 108110858 A 6/2018
CN 108600111 A 9/2018

OTHER PUBLICATIONS

Fafoutis et al., "Energy Neural Activity Monitoring: Wearables Powered By Smart Inductive Charging Surfaces," 2016, 13th Annual IEEE International Conference On Sensing, Communication, and Networking (SECON), pp. 1-9, 9 pages.

*Primary Examiner* — Nghia M Doan
(74) *Attorney, Agent, or Firm* — Muncy, Geissler, Olds & Lowe, P.C.

(57) ABSTRACT

Method for activating predefined functions, implemented in a host appliance integrating or linked to a wireless charging device, and including the steps of: detecting that a mobile appliance has just been positioned on a reception surface of the wireless charging device in order to be recharged; following the detection that the mobile appliance has just been positioned on the reception surface, activating or deactivating at least one predefined first function performed by the host appliance, in addition to recharging the mobile appliance; then, detecting that the mobile appliance has just been moved away from the reception surface; following the detection that the mobile appliance has just been moved away from the reception surface, activating or deactivating at least one predefined second function performed by the host appliance.

13 Claims, 3 Drawing Sheets

(51) Int. Cl.
  *H02J 50/90* (2016.01)
  *H02J 50/80* (2016.01)
  *H04W 88/04* (2009.01)

(58) Field of Classification Search
  CPC ... H02J 7/007188; H04W 88/04; H04W 4/80;
   H04W 4/029; H04W 48/06; H04B
   5/0037; G06F 3/0416; H04L 12/12; H04L
   12/66
  See application file for complete search history.

(56) References Cited

U.S. PATENT DOCUMENTS

| | | | |
|---|---|---|---|
| 2019/0319475 A1* | 10/2019 | Pinciuc | H02J 50/90 |
| 2020/0059113 A1* | 2/2020 | Thirumalai Ananthan Pillai | H04B 5/0037 |
| 2020/0280198 A1* | 9/2020 | Kwon | H02J 7/00034 |

* cited by examiner

METHOD FOR ACTIVATING FUNCTIONS, IMPLEMENTED IN A HOST APPLIANCE INTEGRATING OR LINKED TO A WIRELESS CHARGING DEVICE

The invention relates to the field of methods for activating functions performed by a host appliance integrating or linked to a wireless charging device.

BACKGROUND OF THE INVENTION

There are nowadays a certain number of means for activating or for deactivating the functions performed by a home gateway, and in particular the Wi-Fi access point function.

The Wi-Fi Protected Setup (or WPS) standard thus provides a user with the option of launching pairing between a new mobile appliance and a home gateway by pressing a physical or virtual button of the home gateway and of the mobile appliance.

Some home gateways also make it possible, via a graphical interface, to program times to activate (and/or deactivate) the Wi-Fi.

A telecoms operator or an administrator is also able to remotely activate or deactivate functions implemented by the home gateway, and in particular activate or deactivate the Wi-Fi, using for example the TR-069 (for Technical Report 069) protocol or the SNMP (for Simple Network Management Protocol) protocol.

These means for activating and for deactivating functions, which means may be used in any type of host appliance (home gateway, decoder module, connected vehicle, etc.) and for any type of function, improve user comfort and the ability of said user to interact with the host appliance and, more generally, with his surroundings.

OBJECT OF THE INVENTION

The object of the invention is to provide a novel method for activating or deactivating functions implemented by a host appliance.

SUMMARY OF THE INVENTION

In order to achieve this aim, what is proposed is a method for activating predefined functions, implemented in a host appliance integrating or linked to a wireless charging device, and comprising the steps of:
  detecting that a mobile appliance has just been positioned on a reception surface of the wireless charging device in order to be recharged;
  following the detection that the mobile appliance has just been positioned on the reception surface, activating or deactivating at least one predefined first function performed by the host appliance, in addition to recharging the mobile appliance;
  then, detecting that the mobile appliance has just been moved away from the reception surface;
  following the detection that the mobile appliance has just been moved away from the reception surface, activating or deactivating at least one predefined second function performed by the host appliance.

The activation method according to the invention therefore makes it possible to activate and to deactivate predefined functions, implemented by a host appliance linked to a wireless charging device, by detecting the presence of the mobile appliance on the wireless charging device in order to be recharged, and by detecting the removal of the mobile appliance. The activation method according to the invention therefore provides a particularly simple method for activating or deactivating functions that are performed not by the mobile appliance but by the host appliance itself.

What is also proposed is a host appliance in which the activation method that has just been described is implemented.

What is also proposed is a computer program comprising instructions for a processing component of a host appliance to implement the activation method that has just been described.

What are furthermore proposed are storage means, characterized in that they store a computer program comprising instructions for a processing component of a host appliance to implement the activation method that has just been described.

The invention will be better understood in the light of the following description of one particular nonlimiting mode of implementation of the invention.

BRIEF DESCRIPTION OF THE DRAWINGS

Reference will be made to the appended drawings, in which.

DETAILED DESCRIPTION OF THE INVENTION

Figure 1:
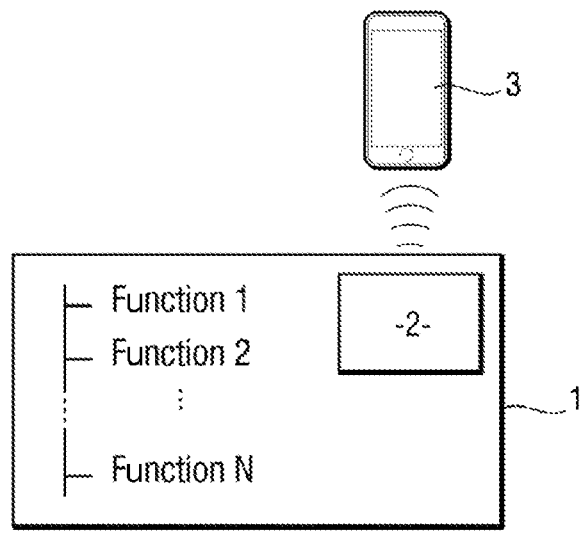
FIG. 1 shows a host appliance integrating a wireless charging device in which the activation method according to the invention is implemented.

With reference to FIG. 1, the activation method according to the invention is implemented here in a host appliance which is a home gateway 1. This home gateway 1 is intended to implement a plurality of predefined functions: function 1, function 2, . . . , function N. These predefined functions include the Wi-Fi access point function.

The home gateway 1 has a processing component (not shown). The processing component is in this case a microcontroller, but could be a different component, for example a processor, an FPGA, an ASIC, etc. The processing component is designed to execute instructions of a program in order to implement the activation method according to the invention.

The home gateway 1 in this case integrates a wireless charging device 2 intended to recharge mobile appliances. The mobile appliances in this case comprise mobile telephones 3.

Figure 2:
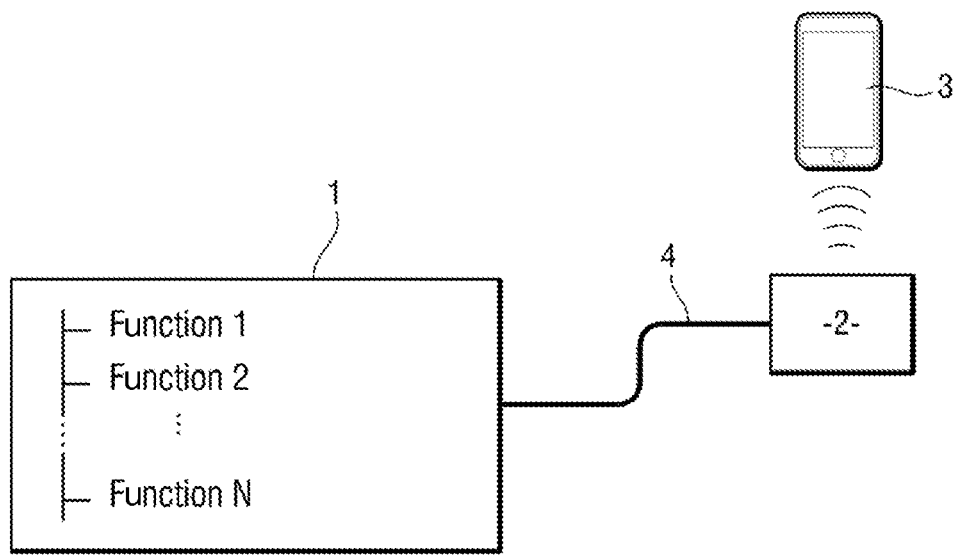
FIG. 2 shows a host appliance linked to a wireless charging device in which the activation method according to the invention is implemented.

With reference to FIG. 2, it is noted that the wireless charging device 2 could very well not be integrated into the home gateway 1, but be linked to the home gateway 1 via a cable 4.

The wireless charging device 2 comprises a reception surface (or base charging surface). As soon as a compatible wireless-charging mobile telephone 3 is positioned on the reception surface (or at the very least the mobile telephone 3 is brought into the immediate proximity of the reception surface), the mobile telephone 3 begins to charge. The wireless charging device 2 draws a charging current from the mains to which the home gateway 1 is connected for its power supply. The charging current is used by the wireless charging device 2 to transmit energy to the mobile telephone 3 in order to recharge it. The energy is transmitted wirelessly through magnetic induction.

The principle of the activation method according to the invention is as follows.

When the home gateway 1 detects that the mobile telephone 3 has just been positioned on the reception surface of the wireless charging device 2 in order to be recharged, the home gateway 1 activates or deactivates one or more predefined first functions in addition to recharging the mobile telephone 3. "In addition to recharging" is understood to mean that the predefined first function or functions are different from recharging the mobile telephone 3, which moreover takes place as intended.

Then, when the home gateway 1 detects that the mobile telephone 3 has just been moved away from the reception surface, the home gateway 1 activates or deactivates one or more predefined second functions.

For good understanding of the invention, a quick description is first of all given of one relatively simple embodiment of the invention. In this embodiment, there is just a single predefined first function and a single predefined second function. The predefined first function and the predefined second function are both one and the same access point function for accessing a Wi-Fi network. This function is activated when the mobile telephone 3 is positioned on the reception surface of the wireless charging device 2, and is deactivated when the mobile telephone 3 is removed from the reception surface. Thus, when the user places his mobile telephone 3 on the reception surface, the Wi-Fi is activated and is available in the user's home. When the user removes his mobile telephone 3 from the reception surface, the Wi-Fi is deactivated.

Of course, the implementation of the invention may be more complex. It is in particular possible to have a plurality of predefined first functions and a plurality of predefined second functions. It is also possible for positioning the mobile telephone 3 on the reception surface to result in the deactivation and not the activation of the predefined first functions, and for removing the mobile telephone 3 from the reception surface to result in the activation and not the deactivation of the predefined second functions.

The predefined first functions and the predefined second functions are performed by the home gateway 1 and not by the mobile telephone 3.

Figure 3:
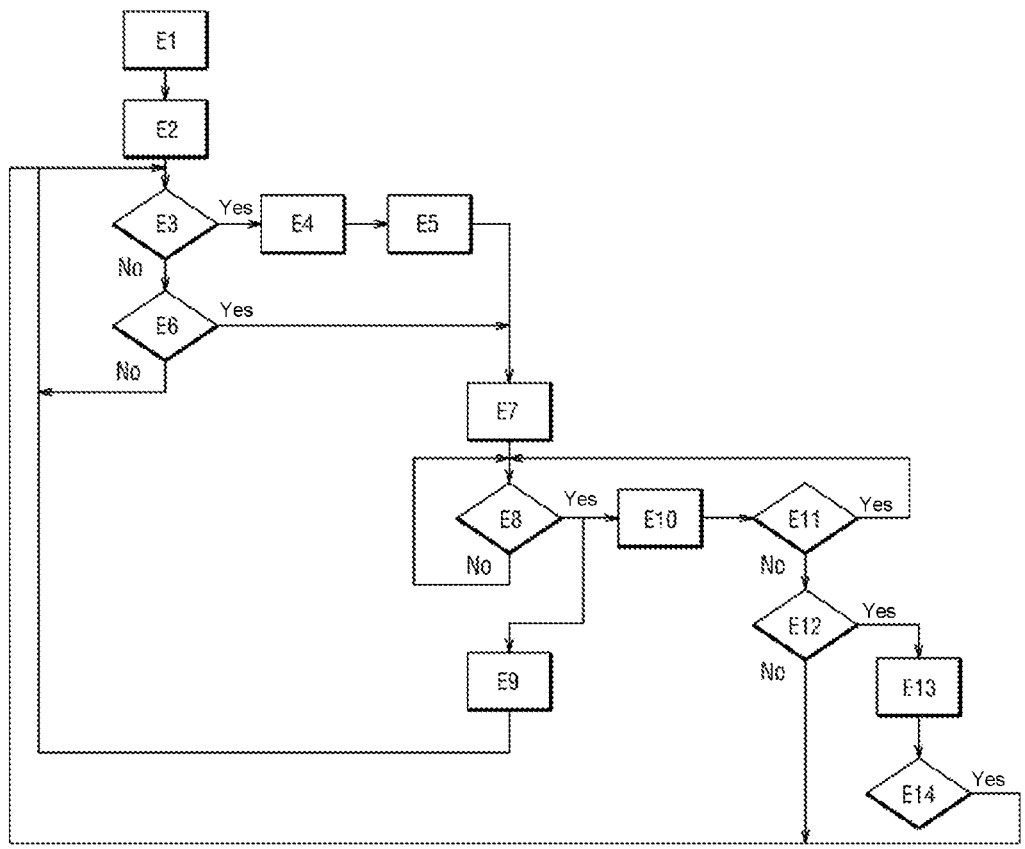
FIG. 3 shows steps of the activation method according to the invention.

A more detailed description is now given, with reference to FIG. 3, of the implementation of the activation method according to the invention.

Figure 4:
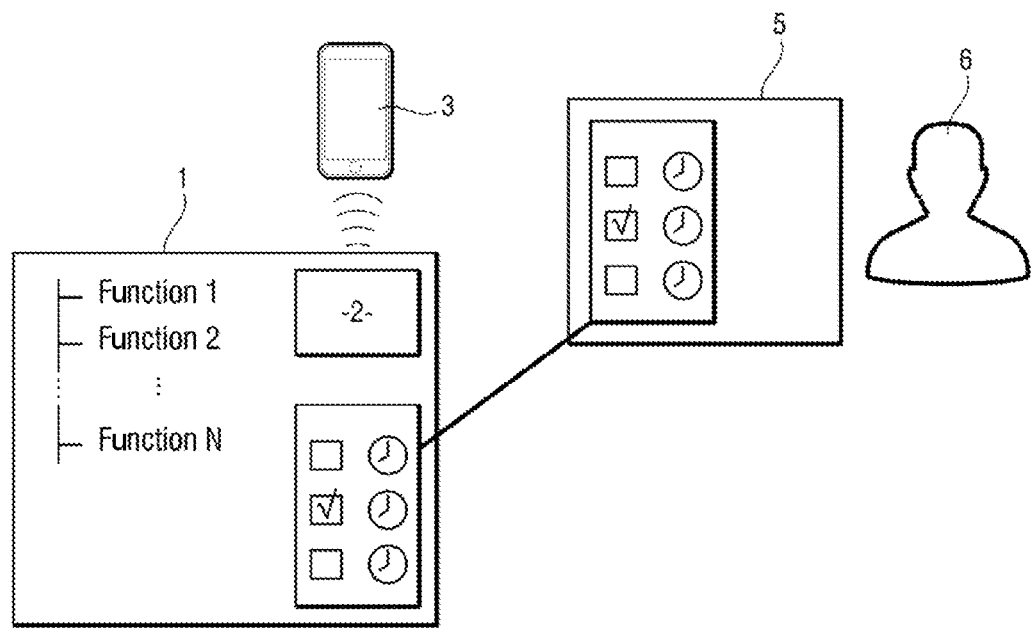
FIG. 4 shows a preliminary step of programming predefined functions.

The activation method first of all comprises a preliminary step of programming functions (step E1). This step is also visible in FIG. 4.

Functions may be programmed via a dedicated application or via a web portal 5. The user 6 programs functions by ticking the functions to be programmed from a list of the functions available on the home gateway 1.

In this case, the home gateway 1 is capable of implementing a plurality of predefined functions, which are classified into a first list of predefined first functions and into a second list of predefined second functions.

Programming functions consists in selecting, from the first list of predefined first functions, one or more predefined first functions that will be activated or deactivated following the detection that a mobile telephone 3 has just been positioned on the reception surface of the wireless charging device 2, and in defining, for each predefined first function, whether it will be activated or else deactivated. Programming functions also consists in selecting, from the second list of predefined functions, one or more predefined second functions that will be activated or deactivated following the detection that the mobile telephone 3 has just been moved away from the reception surface, and in defining, for each predefined second function, whether it will be activated or else deactivated.

There may also be provision, at the time when the mobile telephone 3 is placed on the reception surface, for the home gateway 1 to identify the mobile telephone 3 and select the predefined first function or functions from among the predefined first functions in the first list and/or select the predefined second function or functions from among the predefined second functions in the second list on the basis of this identification.

If the mobile telephone 3 broadcasts an identifier in the flow of information exchanged between the mobile telephone 3 and the wireless charging device 2 (for example a unique identifier, a MAC address, a serial number, etc.), then the triggering of functions may be made conditional on this identifier.

Thus, for example, positioning a mobile telephone no. on the reception surface could activate a predefined first function no. 1 and deactivate a predefined first function no. 2, whereas positioning a mobile telephone no. 2 on the reception surface could activate only the predefined first function no. 1.

For example, positioning the mobile telephone of the head of the family on the reception surface will activate the Wi-Fi network (function no. 1) and will deactivate parental control of the home gateway (function no. 2), whereas positioning the mobile telephone of another person on the reception surface will activate the Wi-Fi network (function no. 1) for guests.

Programming functions may also consist in defining a predetermined first delay for each predefined first function (or only for one or for some of the predefined first functions). The predefined first function is activated or deactivated only after the predetermined first delay has elapsed following the detection that the mobile telephone 3 has just been positioned on the reception surface.

Programming functions may also consist in defining a first time for each predefined first function (or only for one or for some of the predefined first functions). Following the detection that the mobile telephone 3 has just been positioned on the reception surface, the predefined first function is activated or deactivated only at the first time.

Of course, programming functions may also consist in defining a predetermined second delay and a second time for each predefined second function (or only for one or for some of the predefined second functions).

For example, the Wi-Fi may be deactivated 20 minutes after detecting that the mobile telephone 3 has been removed from the reception surface.

Following this programming of functions, the host appliance is in an initial state (step E2).

The activation method then comprises the step of detecting that a mobile telephone 3 has just been positioned on the reception surface.

If the mobile telephone 3 is capable of communicating with the home gateway 1 or with the wireless charging device 2, the detection is performed by the home gateway 1 based on the reception of predefined data able to be transmitted to the home gateway 1 or to the wireless charging device 2 by the mobile telephone 3 (step E3).

If the wireless charging device 2 uses the Qi standard, the mobile telephone 3 transmits predefined data thereto during recharging in order to manage the recharging. The predefined data are defined by the Qi standard. The predefined data for example comprise an evaluation of the signal strength received by the mobile telephone 3 (in order to indicate presence thereof), an identifier, a power level required to recharge it, control data, etc. The wireless charging device 2 adjusts the power that is transmitted on the basis of these predefined data.

The reception of these predefined data thus allows the home gateway 1 to detect the presence of the mobile telephone 3 on the reception surface.

The predefined data are processed (step E4) and allow the charging to be managed (step E5).

Figure 5:
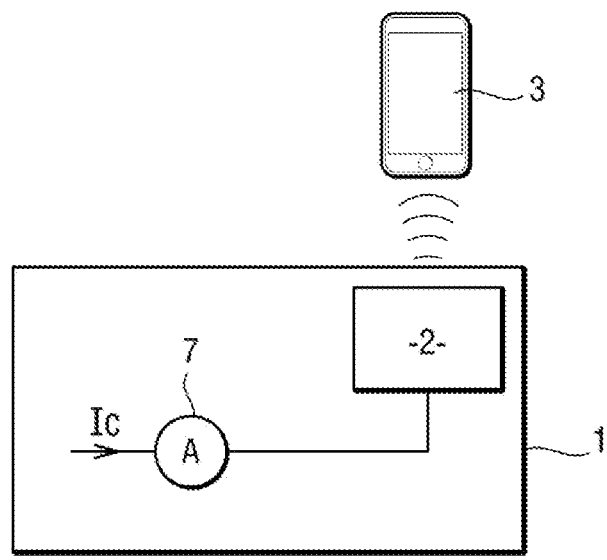
FIG. 5 shows a step of detecting the presence of the mobile appliance based on a measurement of the charging current drawn by the wireless charging device.

If the mobile telephone 3 is not capable of communicating with the home gateway 1 or with the wireless charging device 2, the home gateway 1 detects that the mobile telephone 3 has just been positioned on the reception surface when a charging current drawn by the wireless charging device 2 in order to perform recharging becomes greater than a predefined first current threshold (step E6). With reference to FIG. 5, the charging current Ic, used to recharge the mobile telephone 3, is measured using a current sensor 7 linked to the wireless charging device 2 and integrated into the home gateway 1.

Figure 6:
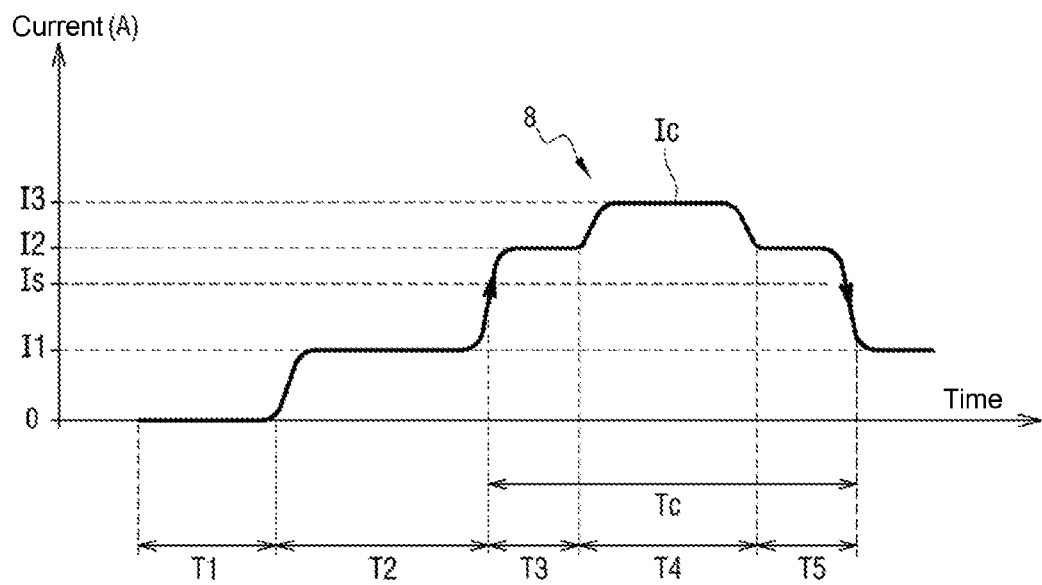
FIG. 6 is a graph comprising a curve of the charging current as a function of time.

FIG. 6 shows that the curve 8 of the charging current Ic as a function of time typically has four levels. When the wireless charging device 2 is not connected or is deactivated for a duration T1, the charging current Ic is zero. When a wireless charging device 2 is connected, the charging current Ic increases and reaches a threshold I1. The charging current Ic remains equal to I1 for the duration T2. When a mobile telephone 3, compatible to be recharged using the wireless charging device 2, is placed on the reception surface in order to be charged, the charging current Ic increases and reaches a threshold I2. The charging current remains equal to I2 for the duration T3. The charging current Ic then increases further and reaches a threshold I3. The charging current Ic remains equal to I3 for the duration T4. After the duration T4, the charging current Ic decreases and again reaches the threshold I2. The charging current Ic remains equal to I2 for the duration T5. Finally, when the mobile telephone 3 is removed from the reception surface, the charging current decreases to the threshold I1.

The duration of the charging Tc is such that:

$$Tc = T3 + T4 + T5.$$

The predefined first threshold for detecting the presence of the mobile telephone 3 is chosen here to be equal to Is, which is between I1 and I2.

For example, a wireless charging base that consumes between 0.024 A and 0.0044 A with no load in USB mode is known. The same base, when charging a mobile telephone, may consume up to 0.750 A. In this configuration, it could be the case that Is=0.300 A.

Using this threshold makes it possible to avoid a false detection of presence (or a false detection of absence) of the mobile telephone 3 on the reception surface.

When the home gateway 1 has detected that the mobile telephone 3 has just been positioned on the reception surface of the wireless charging device 2, the predefined first function or functions are activated or deactivated, possibly after first delays, possibly at instants corresponding to the first times, and possibly on the basis of the identification of the mobile telephone 3 (step E7).

Once the predefined first functions have been activated, the activation method waits until the home gateway 1 detects that the mobile telephone 3 has just been moved away from the reception surface.

When the home gateway 1 detects that the mobile telephone 3 has just been moved away from the reception surface (step E8), the predefined second function or functions are activated or deactivated, possibly with second delays, possibly at instants corresponding to the second times, and possibly on the basis of the identification of the mobile telephone 3 (step E9).

If the mobile telephone 3 is capable of communicating with the home gateway 1 or with the wireless charging device 2, the removal of the mobile telephone 3 may be detected based on the reception of the predefined data and, for example, based on a very weak evaluation of the signal strength received by the mobile telephone 3. The detection may also be performed based on the lack of reception of predefined data: if the home gateway 1 is no longer able to communicate with the mobile telephone 3, it deduces therefrom that said mobile telephone has been removed from the reception surface.

If the mobile telephone 3 is not capable of communicating with the home gateway 1 or with the wireless charging device 2, the home gateway 1 detects that the mobile telephone 3 has just been removed from the reception surface when the charging current Ic drawn by the wireless charging device 2 becomes lower than a predefined second current threshold.

In this case, the predefined second current threshold is equal to the predefined first current threshold (but this might not be the case): the predefined second current threshold is equal to Is.

It is noted that, at the time of step E8, following the detection that the mobile telephone 3 has just been moved away from the reception surface, there may be provision for the home gateway 1 to produce or acquire geolocation data for the mobile telephone 3 (step E10).

The home gateway 1 may itself produce or contribute to producing the geolocation data. The data may in this case for example be produced by Bluetooth triangulation. More simply, the geolocation may consist in checking that the mobile telephone 3 is still connected to the Wi-Fi network implemented by the home gateway 1.

The geolocation data may also be produced by the mobile telephone 3 itself and then transmitted to the home gateway 1. These geolocation data may in this case be produced for example using a GPS receiver integrated into the mobile telephone 3.

The home gateway 1 will then activate or deactivate the predefined second function or functions on the basis of a position of the mobile telephone 3.

The home gateway 1 will for example determine whether the mobile telephone 3 is located within a predefined area, for example in the user's home (step E11). If this is the case, there may be provision for a predefined second function not to be deactivated. For example, the Wi-Fi will not be deactivated for as long as the mobile telephone 3 has not left the home.

There may also be provision for the Wi-Fi network not to be deactivated for as long as the mobile telephone 3 has not left the area of coverage of the Wi-Fi network.

The home gateway 1 may also transmit a notification to the mobile telephone 3 for the purpose of interrogating the user of the mobile telephone 3 in order to determine whether the user wishes to activate or deactivate the predefined second function or functions. If the user accepts this option, a push notification may be sent to the mobile telephone 3 in order to ask for the user's instruction. The push that is thus received may wake an application on the mobile telephone 3 that interrogates the user as to his intentions (that is to say to activate or to deactivate the predefined second function or functions, or else to do nothing). The user transmits his intentions manually, for example by pressing a given area of the touchscreen of the mobile telephone 3. A lack of response within a configurable delay could engage the default behaviour (for example deactivating a predefined second function).

Thus, following step E11, the home gateway checks that the user has indeed authorized this manual confirmation method (step E12). If this is the case, the push notification is sent to the mobile telephone 3 (step E13), and the user has to confirm whether or not he wishes to deactivate the Wi-Fi (step E14).

Of course, the invention is not limited to the described embodiment but encompasses all variants that come within the scope of the invention as defined by the claims.

It has been described here that the host appliance is a home gateway, but it could be any type of appliance able to integrate or to be linked to a wireless charging device, and for example a decoder module, a connected vehicle, etc.

It has also been described here that the mobile appliance is a mobile telephone, but it could be any type of mobile appliance able to be recharged by a wireless charging device, and for example a tablet, a connected watch, etc.

The function primarily outlined here is an access point function for accessing a Wi-Fi network. Any type of function may of course be contemplated. All of the functions able to be implemented by a host appliance able to be linked to a wireless charging device could be activated or deactivated according to the activation method of the invention: activation or deactivation of an alarm protecting the user's home (or of another type of alarm), of video surveillance, playing of music or any type of multimedia content, etc.

The invention claimed is:

1. A method for activating predefined functions, implemented in a host appliance integrating or linked to a wireless charging device, and comprising the steps of:
   detecting that a mobile appliance has just been positioned on a reception surface of the wireless charging device in order to be recharged;
   following the detection that the mobile appliance has just been positioned on the reception surface, activating or deactivating at least one predefined first function performed by the host appliance, in addition and simultaneously to recharging the mobile appliance;
   then, detecting that the mobile appliance has just been moved away from the reception surface;
   following the detection that the mobile appliance has just been moved away from the reception surface, activating or deactivating at least one predefined second function performed by the host appliance;
   wherein the predefined first function belongs to a first list of at least two predefined functions and/or wherein the predefined second function belongs to a second list of at least two predefined functions.

2. The activation method according to claim 1, wherein the predefined first function and the predefined second function are one and the same predefined function, and wherein, following the detection that the mobile appliance has just been positioned on the reception surface, the predefined function is activated and, following the detection that the mobile appliance has just been moved away from the reception surface, the predefined function is deactivated.

3. The activation method according to claim 2, wherein the predefined function is an access point function for accessing a Wi-Fi network.

4. The activation method according to claim 1, furthermore comprising the step of identifying the mobile appliance and of selecting the predefined first function from among the predefined first functions in the first list and/or of selecting the predefined second function from among the predefined second functions in the second list on the basis of this identification.

5. The activation method according to claim 1, wherein the host appliance detects that the mobile appliance has just been positioned on the reception surface and that the mobile appliance has just been moved away from the reception surface based on the reception or the lack of reception of predefined data able to be transmitted to the host appliance or to the wireless charging device by the mobile appliance.

6. The activation method according to claim 5, wherein the predefined data are data exchanged during recharging of the mobile appliance, which is performed in accordance with a standard defining said predefined data.

7. The activation method according to claim 1, wherein the host appliance detects that the mobile appliance has just been positioned on the reception surface when a charging current drawn by the wireless charging device becomes greater than a predefined first current threshold, and wherein the host appliance detects that the mobile appliance has just been moved away from the reception surface when the charging current becomes lower than a predefined second current threshold.

8. The activation method according to claim 1, wherein, following the detection that the mobile appliance has just been positioned on the reception surface, the predefined first function is activated or deactivated after a predetermined first delay, and wherein, following the detection that the mobile appliance has just been moved away from the reception surface, the predefined second function is activated or deactivated after a predetermined second delay.

9. The activation method according to claim 1, furthermore comprising the step, following the detection that the mobile appliance has just been moved away from the reception surface, of producing or acquiring geolocation data for the mobile appliance and of activating or deactivating the predefined second function on the basis of a position of the mobile appliance.

10. A host appliance in which the activation method according to claim 1 is implemented.

11. The host appliance according to claim 10, the host appliance being a home gateway or a decoder module or a connected vehicle.

12. An activation method for activating predefined functions, implemented in a host appliance integrating or linked to a wireless charging device, and comprising the steps of:
    detecting that a mobile appliance has just been positioned on a reception surface of the wireless charging device in order to be recharged;
    following the detection that the mobile appliance has just been positioned on the reception surface, activating or deactivating at least one predefined first function performed by the host appliance, in addition and simultaneously to recharging the mobile appliance;

then, detecting that the mobile appliance has just been moved away from the reception surface;

following the detection that the mobile appliance has just been moved away from the reception surface, transmitting a notification to the mobile appliance in order to interrogate a user of the mobile appliance in order to determine whether or not the user wishes to activate or deactivate at least one predefined second function performed by the host appliance;

wherein the predefined first function belongs to a first list of at least two predefined functions and/or wherein the predefined second function belongs to a second list of at least two predefined functions.

13. A non-transitory computer-readable storage medium storing a computer program comprising instructions for a processing component of a host appliance to implement a method for activating predefined functions, implemented in the host appliance integrating or linked to a wireless charging device, and comprising the steps of:

detecting that a mobile appliance has just been positioned on a reception surface of the wireless charging device in order to be recharged;

following the detection that the mobile appliance has just been positioned on the reception surface, activating or deactivating at least one predefined first function performed by the host appliance, in addition and simultaneously to recharging the mobile appliance;

then, detecting that the mobile appliance has just been moved away from the reception surface;

following the detection that the mobile appliance has just been moved away from the reception surface, activating or deactivating at least one predefined second function performed by the host appliance;

wherein the predefined first function belongs to a first list of at least two predefined functions and/or wherein the predefined second function belongs to a second list of at least two predefined functions.

\* \* \* \* \*